United States Patent [19]

Kimura et al.

[11] Patent Number: 5,407,328
[45] Date of Patent: Apr. 18, 1995

[54] DISPLACEMENT DETECTOR OF VARIABLE DISPLACEMENT TYPE COMPRESSOR

[75] Inventors: Kazuya Kimura; Hiroaki Kayukawa, both of Kariya, Japan

[73] Assignee: Kabushiki Kaisha Toyoda Jidoshokki Seisakusho, Kariya, Japan

[21] Appl. No.: 72,593

[22] Filed: Jun. 4, 1993

[30] Foreign Application Priority Data

Jun. 9, 1992 [JP] Japan .................. 4-149718

[51] Int. Cl.6 ................................. F04B 1/26
[52] U.S. Cl. .................. 417/222.1; 417/63; 417/269
[58] Field of Search ........... 417/222.1, 222.2, 63, 417/269; 324/207.24, 207.25, 174

[56] References Cited

U.S. PATENT DOCUMENTS

| | | | |
|---|---|---|---|
| 2,283,277 | 5/1992 | Modine | 324/207.26 |
| 4,393,966 | 7/1983 | Kono et al. | 417/223 |
| 4,551,676 | 11/1985 | Amemiya et al. | 324/174 |
| 4,586,874 | 5/1986 | Hiraga et al. | 417/222.2 |
| 4,655,689 | 7/1987 | Westveer et al. | 417/222.1 |
| 4,737,079 | 4/1988 | Kurosawa et al. | 417/222.2 |
| 4,822,252 | 4/1989 | Ishikawa et al. | 417/222 |
| 4,870,358 | 9/1989 | Glaize et al. | 324/207.25 |
| 4,901,015 | 2/1990 | Pospischil et al. | 324/174 |
| 5,003,260 | 3/1991 | Auchterlonie | 324/207.24 |
| 5,046,927 | 9/1991 | Ohno et al. | 417/222.2 |
| 5,059,097 | 10/1991 | Okazaki et al. | 417/222.2 |
| 5,150,115 | 9/1992 | DeTong | 324/207.25 |
| 5,191,283 | 3/1993 | Gesenhues | 324/207.24 |
| 5,260,651 | 11/1993 | Tischer et al. | 324/207.24 |

FOREIGN PATENT DOCUMENTS

| | | | |
|---|---|---|---|
| 62-218670 | 9/1987 | Japan . | |
| 3238314 | 10/1991 | Japan | 324/207.24 |

*Primary Examiner*—Richard A. Bertsch
*Assistant Examiner*—Peter Korytnyk
*Attorney, Agent, or Firm*—Brooks Haidt Haffner & Delahunty

[57] ABSTRACT

A swash plate of a variable displacement type compressor is swingably provided within a housing. Pistons reciprocate according to the swinging motion of the swash plate. The gas is compressed and discharged in response to the reciprocal motion of the pistons. As a stroke of the piston is varied according to the inclination angle of the swash plate, displacement of the compressor is varied. A displacement detector of the compressor includes a detected piece made of magnet. The detected piece is attached to one of the piston and a member which reciprocates in association with the piston. Detecting wires are arranged along the reciprocating locus of detected piece, and include a plurality of cyclic units which cross the center line extending in the longitudinal direction.

10 Claims, 9 Drawing Sheets

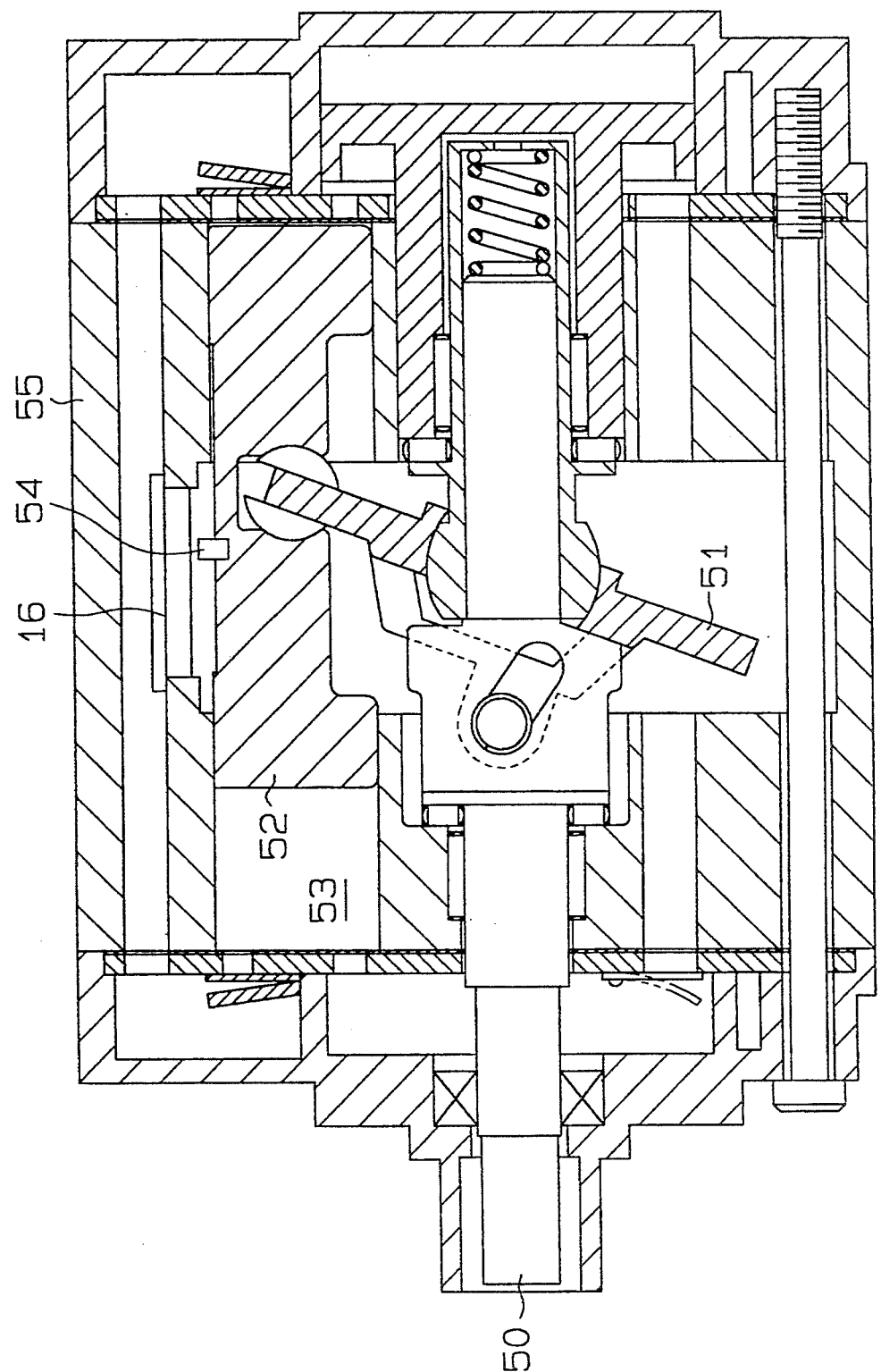

DISPLACEMENT DETECTOR OF VARIABLE DISPLACEMENT TYPE COMPRESSOR

BACKGROUND OF THE INVENTION

1. Field of the Invention

The present invention relates to a variable displacement type compressor. More specifically, it relates to a variable displacement type compressor, of which discharge displacement is varied according to piston stroke by controlling an inclination angle of a swash plate.

2. Description of the Related Art

In general, an engine speed of a vehicular engine is varied according to a load applied to the engine during idling period. When a compressor is mounted on a vehicle, the compressor constitutes a part of the load applied to the engine. A load applied to the compressor influences the engine speed. Therefore, the engine speed should be controlled while the variation of the load applied to the compressor is considered, in order to drive the vehicle comfortably without stalling the engine running during the idling period.

To achieve this type of engine control, Japanese Unexamined Patent Publication No. 62-218670 discloses an apparatus for detecting displacement of a variable displacement type compressor. In this conventional apparatus, a detected piece is attached at the circumference of a swash plate. A housing includes a detector which is disposed between a swinging center of the detected piece and one swinging limit position. The detector detects a period when the detected piece is positioned at right side beyond the detector, and a period when the detected piece is positioned at left side beyond the detector. The ratio of the period (i.e., existing ratio of the detected piece) when the detected piece is positioned at either the right or left sides beyond the detector to a sum of both periods (i.e., a period of time when a swash plate takes to complete a swinging cycle) differs each other according to the displacement of compressors. This allows to calculate the displacement of the compressor.

However, in the conventional apparatus for detecting the displacement, variation of the existing ratio of the detected piece is small with respect to the variation of the inclination angle of the swash plate when the swash plate is in the region of large inclination angle (i.e., the region of displacement is large). Therefore, displacement detection accuracy in the large displacement region is exceptionally unsatisfactory. In other words, output values of detected signals by the apparatus have relatively low linearity. Therefore, even when the detection level of the displacement of the compressor is divided into three stages (i.e., large, intermediate, and small), and the displacement is vaguely detected to categorize into one of three stages, it is rather difficult to detect the displacement.

Therefore, the engine speed of the vehicular engine on which the compressor is mounted can not be accurately controlled during the idling period.

For another type of apparatus which detects the displacement, the apparatus including a plurality of small Hole elements is known. However, this apparatus has drawbacks in which the discrimination and thermal durability are not superior, and the wiring operation becomes troublesome due to the increase of the number of wires for outputting signals.

SUMMARY OF THE INVENTION

It is a primary objective of the present invention to provide an apparatus which has a superior detection accuracy and a simple structure.

To achieve the foregoing and other objects in accordance with the purpose of the present invention, a variable displacement type swash plate compressor according to the present invention includes a swash plate which is swingably disposed within a housing. A piston is reciprocated according to the swinging motion of the swash plate. A gas is compressed and discharged in accordance with the reciprocal motion of the piston. A stroke of the piston is varied according to the inclination angle of the swash plate. Therefore, the displacement of the gas is varied. An apparatus for detecting the displacement of the gas includes a detected piece made of magnet. The detected piece is attached to one of the piston and a member which reciprocates together with the piston. A detecting wire is arranged along the reciprocating locus of the detected piece. The detecting wire has a longitudinal center line and a plurality of bent cyclic units which are arranged along the center line. Each of the units crosses the center line.

BRIEF DESCRIPTION OF THE DRAWINGS

The features of the present invention that are believed to be novel are set forth with particularity in the appended claims. The invention, together with the objects and advantages thereof may best be understood by reference to the following description of the presently preferred embodiments taken in conjunction with the accompanying drawings, in which:

FIG. 9 is a cross sectional view according to another embodiment in which the present invention is employed in a compressor including a two-head piston.

DESCRIPTION OF THE PREFERRED EMBODIMENTS

Figure 1:
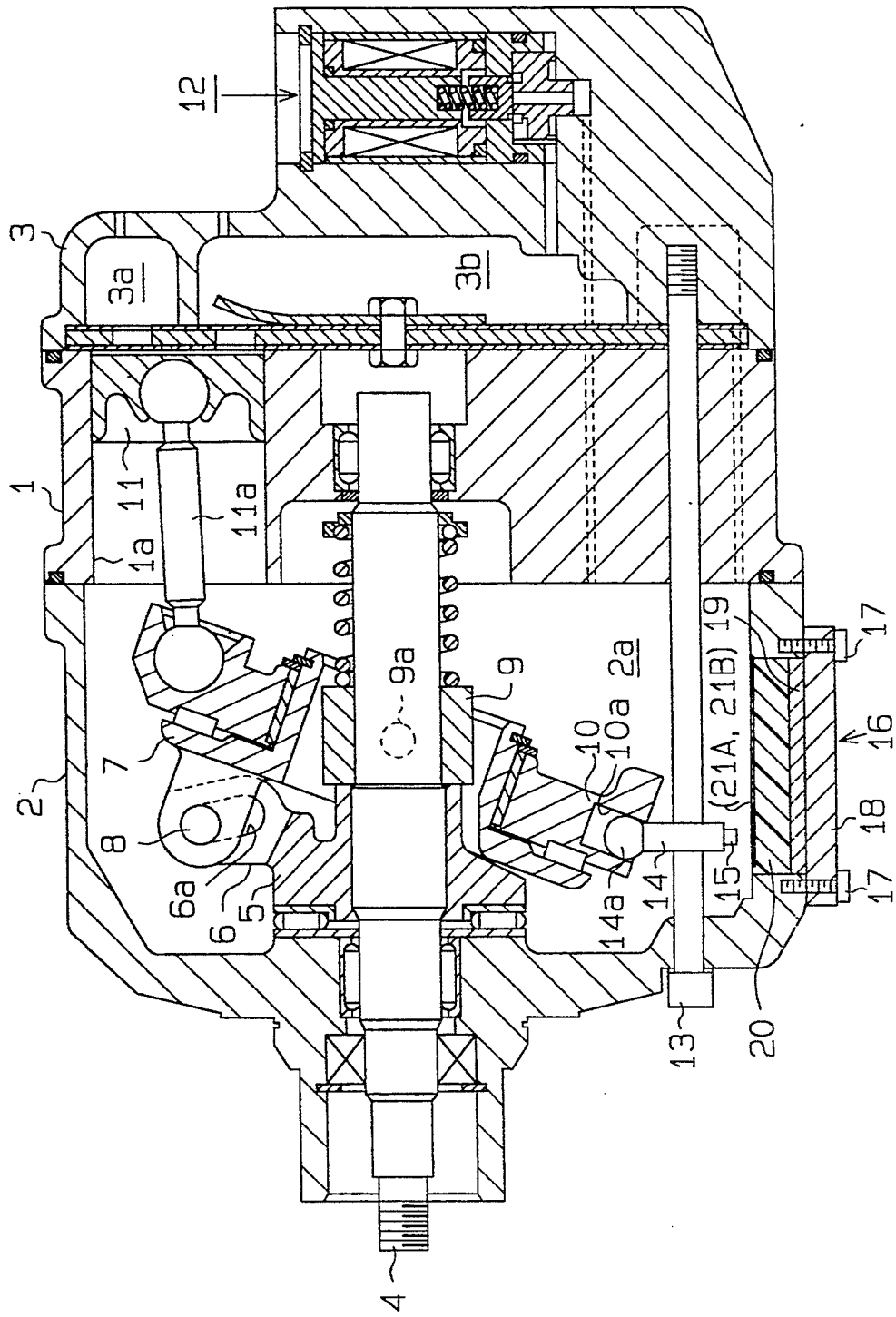
FIG. 1 is a cross sectional side view showing a compressor of this embodiment according to the present invention.

A preferred embodiment of a variable displacement type swash plate compressor according to the present invention will now be described, with reference to FIGS. 1 through 6.

A cylinder block 1 formes a part of housing of an entire compressor. The cylinder block 1 includes a front housing 2 and rear housing 3 which are disposed at the front and rear sections thereof and secured therewith, respectively. A drive shaft 4 is rotatably supported by the cylinder block 1 and front housing 2. A drive plate 5 is securely mounted on the drive shaft 4. A support arm 6 is projected from the drive plate 5. A guide hole 6a is bored through the support arm 6. A pin 8 is slidably inserted into the guide hole 6a, such that a rotary journal 7 is tiltably connected to the pin 8.

A guide sleeve 9 is slidably mounted on the drive shaft 4. The rotary journal 7 is swingably supported by means of a pin 9a which protrudes beyond both sides of the guide sleeve 9. Swinging of the rotary journal 7 is guided according to the engagement of the guide hole 6a and pin 8, and the sliding of the guide sleeve 9.

A swash plate 10 is supported on the rotary journal 7, and relatively rotatable therewith. A plurality of cylinder bores 1a are formed within the cylinder block 1, which mutually communicate with a crank case 2a, a suction chamber 3a and a discharge chamber 3b within the rear housing 3. Each bore 1a accommodates a piston 11 which is linked to the swash plate 10, via a piston rod 11a. Therefore, the rotational motion of the drive shaft 4 is converted into the reciprocal motion of the swash plate 10, via the rotational journal 7. The pistons 11 reciprocate within the bores 1a in the forward and backward direction, respectively. A refrigerant gas sucked from the suction chamber 3a to the bores 1a is compressed and discharged into the discharge chamber 3b according to the reciprocal motions of the pistons 11, respectively. The strokes of the pistons 11 are varied according to the difference in pressure between the internal pressure of the crank case 2a and the suction pressure in the bores 1a. As a result, an inclination angle of the swash plate 10 is varied. The displacement of the compressor is varied according to the variation of the inclination angle of the swash plate 10. The internal pressure of the crank case 2a is controlled by an electromagnetic control valve 12 which is disposed within the rear extended portion of the rear housing 3.

A plurality of bolts 13 (i.e., only one bolt is shown) are provided for tightly securing the cylinder block 1, front housing 2 and rear housing 3 together. One of the bolts 13 is disposed underneath of the swash plate 10. A slider 14 is slidably supported by this bolt 13. A journal 14a having a spherical shape is integrally formed with the slider 14. A hole 10a having a circular cross section is formed in the bottom circumference portion of the swash plate 10. The journal 14a is slidably fitted into the hole 10a. Although the swash plate 10 is swingable along the axial direction of the bolt 13, the slider 14 prevents the swash plate 10 from rotating.

Figure 2:
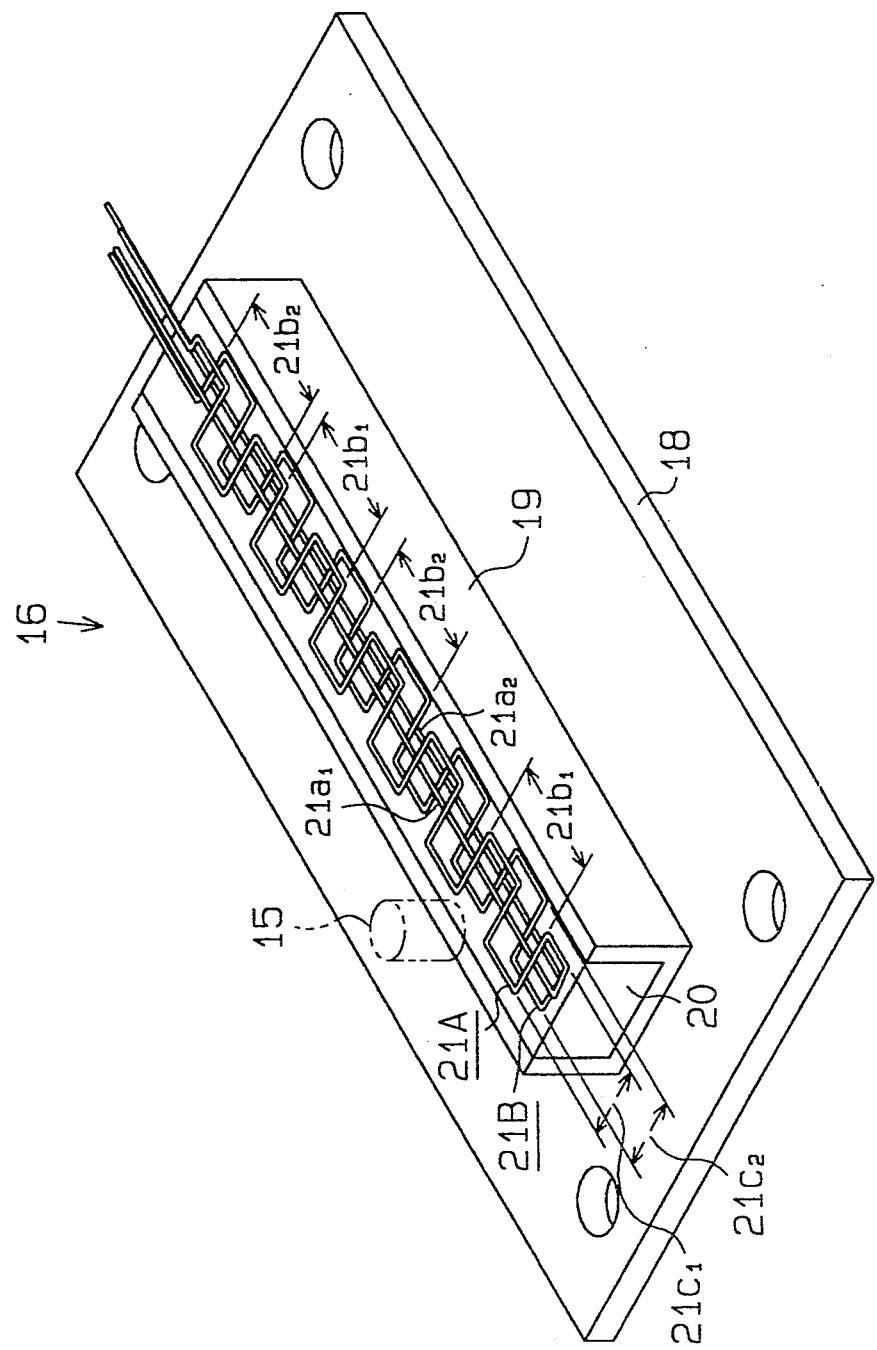
FIG. 2 is a perspective view showing an essential portion of an apparatus for detecting displacement of the compressor in FIG. 1.

A detected piece 15 made of magnet is secured to the bottom end of the slider 14. A magnetic sensor 16 is disposed just under the reciprocal locus of the magnet 15 that moves in response to the swinging motion of the swash plate 10. As shown in FIG. 2, the magnetic sensor 16 includes a base plate 18 which is secured to the front housing 2 by means of screws 17. A channel-shaped support frame 19 is secured to the top surface of the base plate 18. The inner section of the support frame 19 is filled with a wire holder 20 which is made of synthetic resin. A pair of a first and a second detecting wires 21A and 21B are arranged one upon another in parallel on the wire holder 20.

The first and second detecting wires 21A and 21B are wired straight from the first end to the second end of the wire holder 20, and are returned at the second end, back to the first end, respectively. The portions of the wires 21A and 21B after the point of return are repeatedly bent in a crank shape at both sides of the straight wires 21A and 21B, along straight line sections 21a1 and 21a2 of the first and second wires 21A and 21B before bent. Therefore, the first and second wires 21A and 21B include the straight line sections 21a1 and 21a2, and rectangular bent sections (i.e., cyclic units) 21b1 and 21b2, respectively. The straight line sections 21a1 and 21a2 pass over the center lines of amplitudes of the rectangular bent sections 21b1 and 21b2 (i.e., center lines of detecting wires), respectively. The rectangular bent sections 21b1 and 21b2 include transverse portions 21c1 and 21c2 which transversely cross with the straight line sections 21a1 and 21a2, and the straight portions which are extended in parallel to the straight line portions, respectively. The rectangular bent section 21b1 of the first detection wire 21A is displaced by one quarter ($\frac{1}{4}$) of a repeated bent unit cycle with respect to that of the rectangular bent section 21b2 of the second detection wire 21B, along the longitudinal direction of the straight line sections 21a1 and 21a2.

Figure 4:
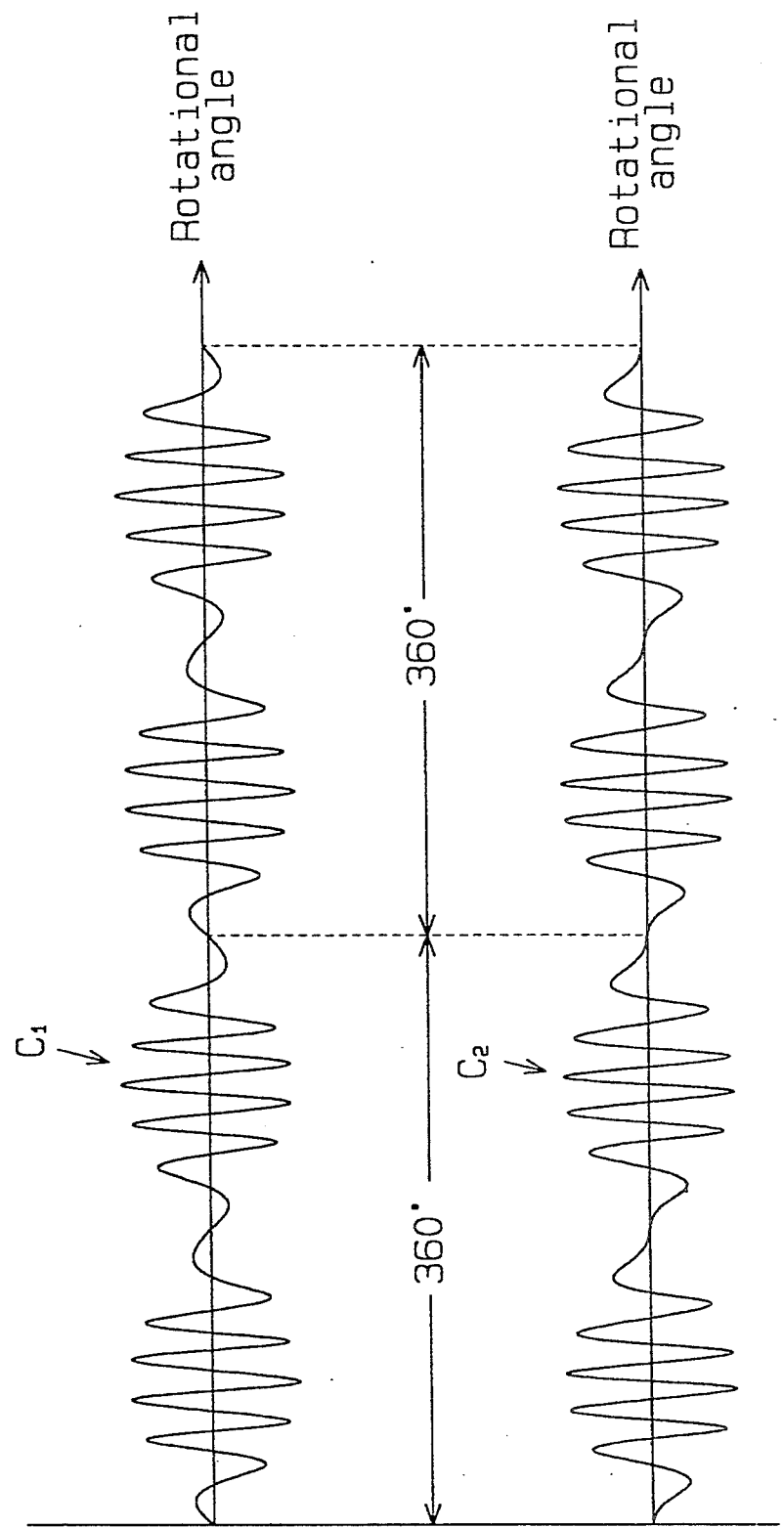
FIG. 4 is a diagram showing wave forms of signals outputted from detecting wires of the apparatus in FIG. 2.

The magnet 15 shifts along the longitudinal direction of the entire rectangular bent sections 21b1 and 21b2, according to the swinging motion of the swash plate 10. At this time, as currents will flow through the first and second detecting wires 21A and 21B which are generated by electromagnetic induction based on magnetic flux of the magnet 15, certain signals C1 and C2 will be outputted, as shown in FIG. 4. The magnet 15 crosses over the transverse portions 21c1 and 21c2 of the bent sections 21b1 and 21b2 respectively, while it is shifting. As closer the magnet 15 approaches the transverse portions 21c1 and 21c2, stronger the magnetic flux acts on the transverse portions 21c1 and 21c2. Therefore, amplitudes of the signals C1 and C2 increase, as shown in FIG. 4. These signals C1 and C2 indicate the condition where the compressor is operating at the full capacity (i.e., 100% capacity).

Figure 3:
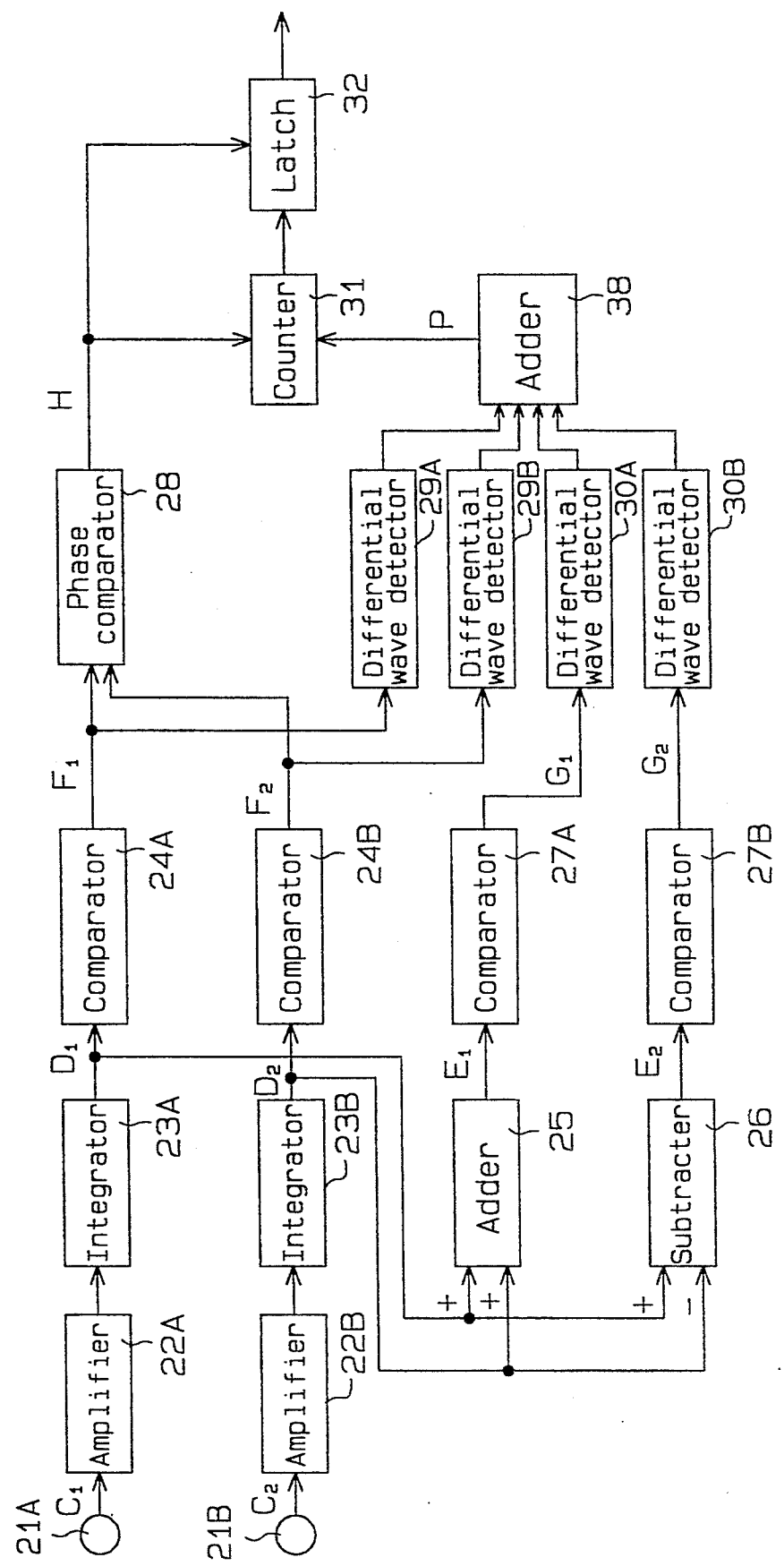
FIG. 3 is a signal control circuit diagram of the apparatus for detecting displacement in FIG. 2.
Figure 5:
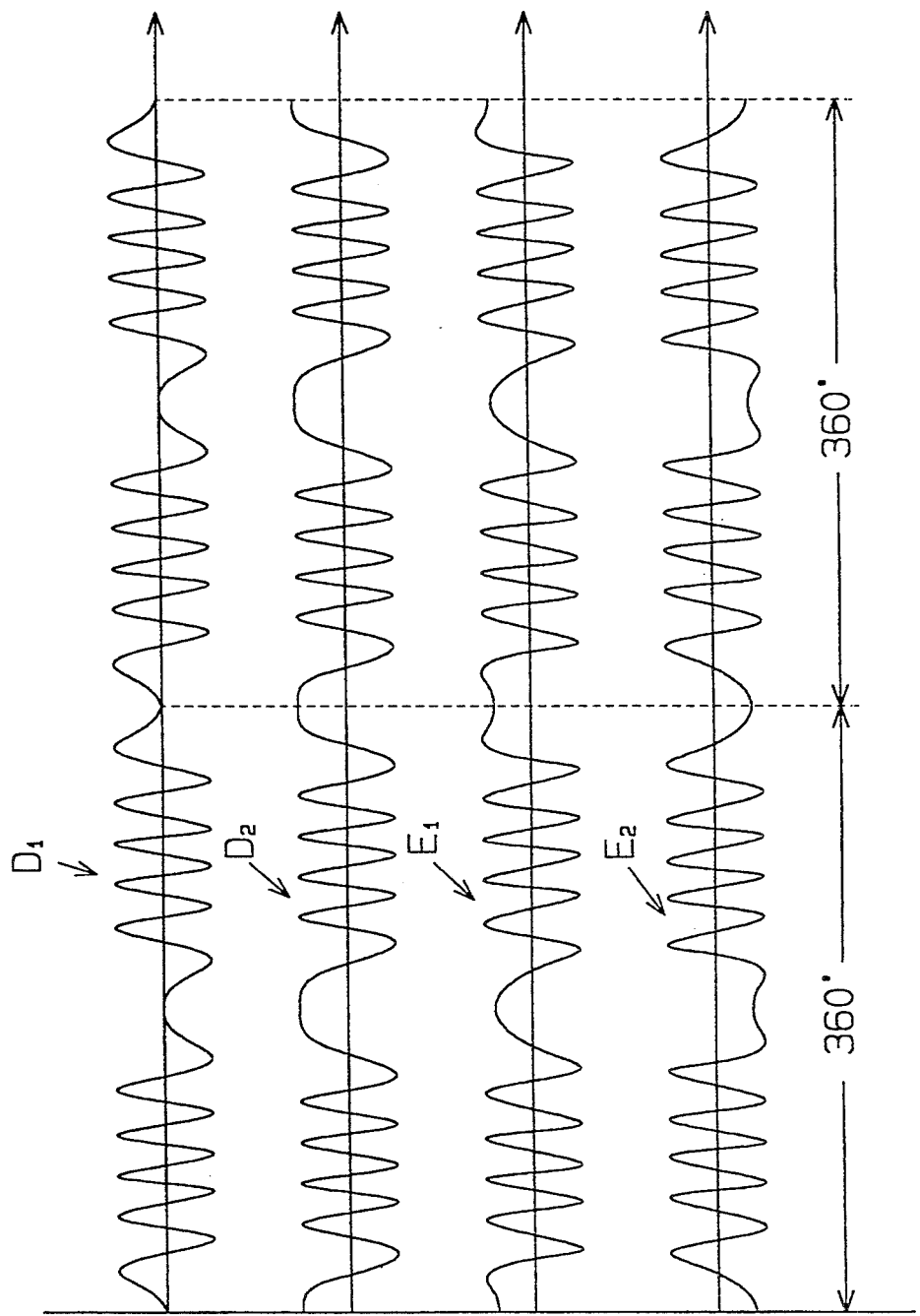
FIG. 5 is a diagram showing wave forms of signals outputted from an integrator, an adder and a subtracter in the signal control circuit in FIG. 3.

FIG. 3 is a signal control circuit diagram which processes signals outputted from the magnetic sensor 16. The signals C1 and C2 outputted from the first and second detecting wires 21A and 21B are amplified by amplifiers 22A and 22B, and then are integrated by integrators 23A and 23B, respectively. Therefore, signals D1 and D2 are outputted from the integrators 23A and 23B, respectively, as shown in FIG. 5.

The signal D1 is outputted to a comparator 24A, an adder 25 and a subtracter 26. The signal D2 is outputted to a comparator 24B, the adder 25 and the subtracter 26. The adder 25 adds up both signals D1 and D2, and outputs a signal E1 shown in FIG. 5 to a comparator 27A. The subtracter 26 calculates the difference between the signals D1 and D2, and outputs a signal E2 shown in FIG. 5 to a comparator 27B. The signals E1 and E2 have phase differences ±45° with respect to the signals C1 and C2, respectively.

Figure 6:
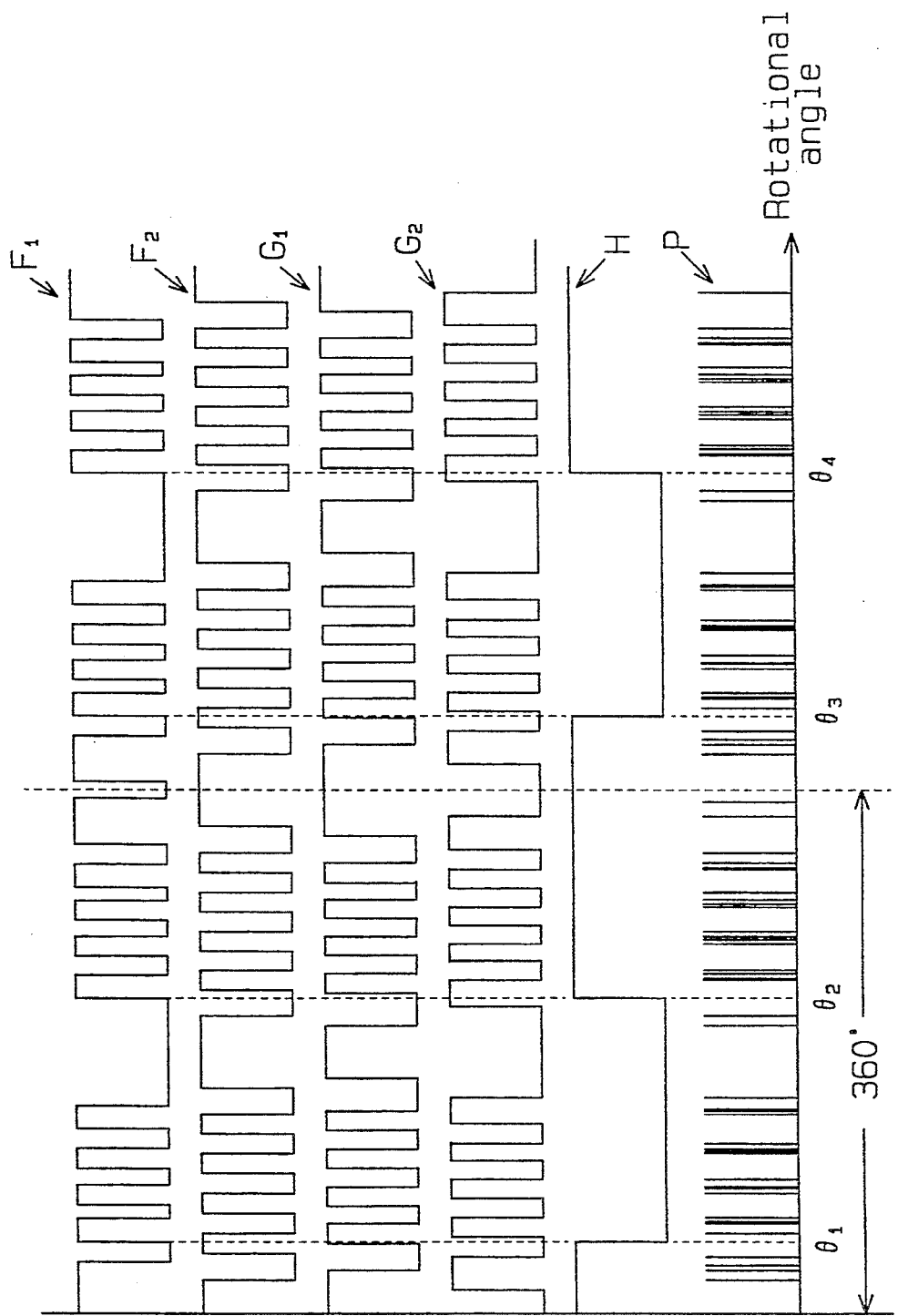
FIG. 6 is a diagram showing wave forms of signals outputted from a comparator and an adder in the signal control circuit in FIG. 3.

The comparators 24A, 24B, 27A and 27B transform the signals D1, D2, E1 and E2 into rectangular wave signals F1, F2, G1 and G2 shown in FIG. 6, and output to differential wave detectors 29A, 29B, 30A and 30B, respectively. When the comparators 24A and 24B input the signals D1 and D2 which have amplitudes exceeding a predetermined value, they form high level signals among the rectangular wave signals F1 and F2 shown in FIG. 6, and output the formed signals to a phase comparator 28 and the differential wave detectors 29A and 29B, respectively. When the comparators 24A and 24B input the signals D1 and D2 which do not exceed the predetermined value, they form low level signals among the rectangular wave signals F1 and F2, and output the formed signals, respectively. When the comparators 27A and 27B input the signals E1 and E2 which have amplitudes exceeding a predetermined value, they form high level signals among the rectangular wave signals G1 and G2 shown in FIG. 6, and output the formed signal to the differential wave detectors 30A and 30B. When the comparators 27A and 27B input the signals E1 and E2 which do not exceed the predetermined value, they form low level signals among the rectangular wave signals among the rectangular wave signals G1 and G2, and output the formed signals, respectively.

The phase comparator 28 compares the phases of the rectangular wave signals F1 and F2, and detects the change of shifting direction of the magnet 15 based on the comparison. In other words, when the magnet 15 is forwardly shifting, the phase of the signal C1 from the first detecting wire 21A is delayed by 90° with respect to the signal C2 from the second detecting wire 21B, based on the disposed relationships of the detecting wires 21A and 21B. When the magnet 15 is backwardly shifting, the phase of the signal C1 is advanced by 90°. Clearly shown in FIG. 6, in rotational angles $\theta 1$ and $\theta 3$ of the drive shaft 4, the phase of the rectangular wave signal F1 corresponding to the signal C1 is switched from the condition advanced by 90° to the condition delayed by 90° with respect to the phase of the rectangular wave signal F2 corresponding to the signal C2. Further, in rotational angles $\theta 2$ and $\theta 4$, the phase of the rectangular wave signal F2 is switched from the condition delayed by 90° to the condition advanced by 90° with respect to the phase of the rectangular wave signal F1. Therefore, the rotational angles $\theta 1$ and $\theta 3$ are approximately equal phase angles. The rotational angles $\theta 2$ and $\theta 4$ are approximately equal phase angles. An interval between the rotational angles $\theta 1$ and $\theta 3$, and between the rotational angles $\theta 2$ and $\theta 4$ corresponds to one cycle of the compressor, respectively.

The phase comparator 28 outputs a signal H with a rectangular wave shape shown in FIG. 6, to a counter 31 and a latch 32 according to the phase relationship between the rectangular wave signals F1 and F2. The signal H is switched from the high level to the low level at the rotational angles $\theta 1$ and $\theta 3$ of the drive shaft 4, and is switched from the low level to the high level at the rotational angles $\theta 2$ and $\theta 4$.

The differential wave detectors 29A, 29B, 30A and 30B output pulse signals to an adder 38 in response to falling edges of the rectangular wave signals F1, F2, G1 and G2. The adder 38 adds up those signals and outputs a pulse signal P shown in FIG. 6 to the counter 31. The counter 31 counts the inputted pulse signal P, and outputs a count signal corresponding to the number of counting to the latch 32. The counter 31 resets the counting value at the rising edge of the rectangular wave signal H (i.e., at the rotational angles $\theta 2$ and $\theta 4$). The latch 32 outputs the counted information gathered until the rising edge of the rectangular wave signal H detected.

The counted information outputted from the latch 32 indicates times when the magnet 15 approaches closely to either one of the rectangular bent portions 21b1 and 21b2 of the first and second detection wires 21A and 21B during the magnet 15 is shifting in the forward or the backward direction. Therefore, the swinging amount of the swash plate 10 (i.e., stroke of the piston 11) can be detected based on the counted information, and the displacement of the compressor can be detected.

In the above-described embodiment, the detection wires 21A and 21B are displaced each other by one quarter of the cycle. According to this wiring arrangement, the number of pulse signals P shown in FIG. 6 is increased, comparing to a case where only one of the detecting wires (21A or 21B) is employed. Therefore, discrimination of the sensor 16 is significantly increased. Furthermore, timings corresponding to a full rotation or a half rotation of the compressor can be detected. Therefore, a rotational detector for the compressor can be eliminated.

The adder 25 and subtracter 26 of the signal control circuit shown in FIG. 3 generate the signals E1 and E2 which have phase differences by ±45° with respect to the signal C1 outputted from the first detecting wire 21A. The discrimination of the sensor can be significantly increased by utilizing the signals E1 and E2.

The circuit can be simplified by eliminating the adder 25, subtracter 26 and comparators 27A and 27B. In such a case, however, the discrimination decreases. If further transverse portions 21c1 and 21c2 of the rectangular bent sections 21b1 and 21b2 were formed, the discrimination can be increased.

According to this embodiment, the straight line sections 21a1 and 21a2 of the detecting wires 21A and 21B are passing underneath of the central portions of the transverse portions 21c1 and 21c2. Therefore, the detecting wires 21A and 21B are not provided in coil forms, respectively. If detection wires were provided in coil forms, the detection wires would sensitively react to magnetic fluctuation of a magnetic clutch assembled to the compressor, in addition to the change of magnetic flux according to the shifting of the magnet 15. In such a case, noises are generated in the signals.

Further, the detecting wires 21A and 21B are wired and supported on the wire holder 20 which is made of synthetic resin. Therefore, eddy current is not generated. If the detecting wires 21A and 21B were disposed in the vicinity of a conductive metal, the eddy current would be generated in the conductive metal. In such a case, there are drawbacks that the level of the output signals are lowered, and the phases are delayed. The apparatus according to this embodiment will not be damaged by heat, comparing to the conventional apparatus employing the Hall elements.

It should be apparent to those skilled in the art that the present invention may be embodied in many other specific forms without departing from the scope of the invention.

Figure 7:
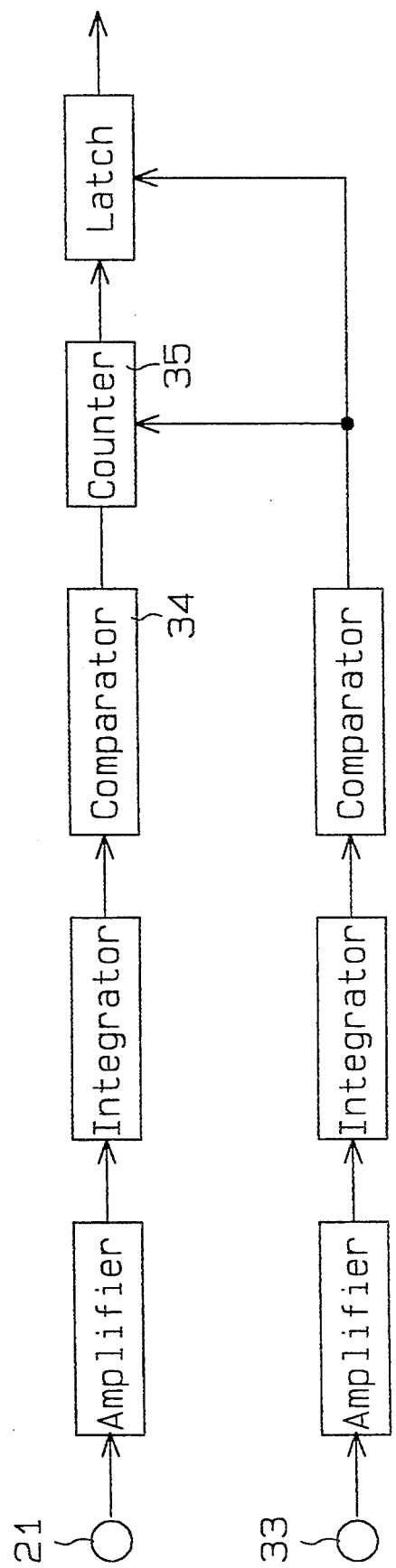
FIG. 7 shows a signal control circuit diagram according to another example.

For example, the present invention can be embodied in another embodiment shown in FIG. 7. This embodiment has a detecting wire 21 including either one of the detecting wires 21A or 21B and circuits similar to the circuits described in the above embodiment, which are connected to the wire 21. A rotational detector 33, a comparator and a integrator which are connected to the detector 33, are provided. In this case, the rotational detector 33 detects the revolutions of the drive shaft 4. A counter 35 counts the edges of rectangular wave signals or pulse signals outputted from a comparator connected to the detecting wire side while the drive shaft 4 is making a single revolution. The displacement of the compressor can be detected based on the number counted by the counter 35. According to this embodiment, the discrimination of the magnetic sensor is decreased. However, the circuit structure becomes significantly simple.

Figure 8:
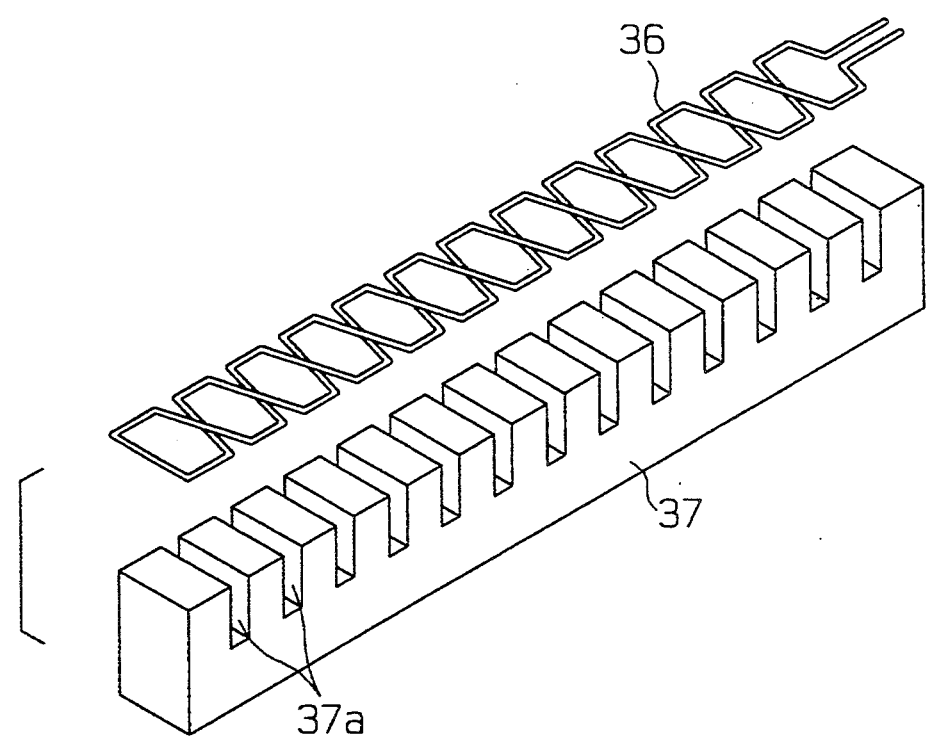
FIG. 8 is a partially disassembled perspective view of the apparatus for detecting displacement according to another example.

In another embodiment shown in FIG. 8, a detecting wire 36 is supported on a wire holder 37 made of magnetic material. A plurality of grooves 37a are formed in the wire holder 37. The detecting wire 36 is inserted into the grooves 37a, and is wound around the wire holder 37. Portions of the detecting wire 36 which come close to the magnet (i.e., similar to the transverse portions 21c1 and 21c2 in the above described embodiment) are disposed in the grooves 37a. As two of the above portions are provided in a single groove 37a, the magnitude of output signal is doubled. However, the grooves 37a are not always required. The magnitude of output signal can be increased by simply wiring the detecting wire 36 on a flat surface of a holder made of magnetic material.

FIG. 9 shows yet another embodiment of the present invention in which a variable displacement type compressor includes a two-head piston. In this case, a two-head piston 52 reciprocates in a cylinder bore 53, according to the inclination angle of a swash plate 51 in response to the rotational motion of a drive shaft 50, to compress a refrigerant gas. A detected piece 54 made of magnet is directly attached to the circumference of the piston 52. The magnetic sensor 16 similar to the above-described embodiment is attached to a cylinder block 55, so that the sensor 16 faces to the reciprocal range of the piston 52. Therefore, in this embodiment, the operational effectiveness similar to the above-described embodiment can be achieved.

What is claimed is:

1. A variable displacement compressor comprising:
   a housing;
   a swash plate swingably disposed for operation at selectable inclination angles in the housing;
   at least one piston disposed in the housing for reciprocation in accordance with the swinging motion of the swash plate for causing compression and discharge of a gas when the piston is reciprocated;
   the stroke of the piston being variable as a function of the inclination angle of the swash plate such that the displacement of the compressor is varied; and
   a displacement detector for detecting the displacement of the compressor;
   said displacement detector including:
   a detected member attached to one of the piston and a member that reciprocates in association with the piston for producing a substantially constant magnetic field that is movable along a reciprocating locus similar to that of the piston; and
   a detecting wire disposed alongside the reciprocating locus of the detected member and having a longitudinal center line and a plurality of repeating units arranged along the longitudinal center line, each repeating unit traversing back and forth across the longitudinal center line.

2. A variable displacement compressor according to claim 1, wherein each of the repeating units has a portion extending in parallel with the longitudinal center line and a portion perpendicular to the longitudinal center line.

3. A variable displacement compressor according to claim 1, wherein the displacement detector has a pair of the detecting wires that are arranged one upon another in parallel, and the repeating units for one of the detecting wires are offset from that for the other of the detecting wires by ¼ cycle.

4. A variable displacement compressor according to claim 3, wherein the pair of detecting wires output electric signals with wave shapes corresponding to their configurations, and wherein the displacement detector includes a second circuit that compares phases of the electric signals with each other in order to detect a rotational position of the compressor.

5. A variable displacement compressor according to claim 1, wherein the detecting wire outputs an electric signal with a wave shape corresponding to its configuration, and wherein the displacement detector includes a first circuit that converts the electric signal into a pulse signal and then counts the pulse signal to detect the displacement.

6. A variable displacement compressor according to claim 1, wherein the detected member is attached to a slider that can make a reciprocating motion along an axis in parallel with a moving direction of the piston, and the slider is rotatably connected to the swash plate.

7. A variable displacement compressor according to claim 1, wherein the piston is a two-head piston, and the detected member is attached to the outer periphery of the two-head piston.

8. A variable displacement compressor according to claim 1, wherein the displacement detector includes a holder made of synthetic resin that holds the detecting wire.

9. A variable displacement compressor according to claim 1, wherein the displacement detector includes a holder made of magnetic material that holds the detecting wire, and a part of the detecting wire is inserted into grooves formed on the holder.

10. A variable displacement compressor comprising:
    a housing;
    a swash plate swingably disposed for operation at selectable inclination angles in the housing;
    at least one piston disposed in the housing for reciprocation in accordance with the swinging motion of the swash plate for causing compression and discharge of a gas when the piston is reciprocated;
    the stroke of the piston being variable as a function of the inclination angle of the swash plate such that the displacement of the compressor is varied; and
    a displacement detector for detecting the displacement of the compressor;
    said displacement detector including:
    a detected member attached to one of the piston and a member that reciprocates in association with the piston for producing a substantially constant magnetic field that is moveable along a reciprocating locus similar to that of the piston;
    a pair of detecting wires disposed alongside the reciprocating locus of the detected member and arranged one upon another in parallel;
    each of said detecting wires having a longitudinal center line and a plurality of repeating units arranged along the longitudinal center line;
    each repeating unit having a portion extending in parallel with the longitudinal center line and a portion perpendicular to the longitudinal center line;
    the repeating units for one of the detecting wires being offset from that for the other of the detecting wires by ¼ cycle;
    each of said detecting wires during operation of the compressor outputting an electric signal with a wave shape corresponding to its configuration;
    a first circuit for converting the electric signal into a pulse signal and then counting the pulses in the pulse signal to detect the displacement; and
    a second circuit for comparing the phases of the electric signals from the detecting wires with each other in order to detect the rotational position of the compressor.

* * * * *